(12) United States Patent
Willemin et al.

(10) Patent No.: US 9,465,364 B2
(45) Date of Patent: Oct. 11, 2016

(54) ILLUMINATION OF A DATE MECHANISM

(71) Applicant: The Swatch Group Research and Development Ltd, Marin (CH)

(72) Inventors: Michel Willemin, Preles (CH); Jean-Claude Martin, Montmollin (CH); Pierpasquale Tortora, Neuchatel (CH)

(73) Assignee: The Swatch Group Research and Development Ltd., Marin (CH)

( * ) Notice: Subject to any disclaimer, the term of this patent is extended or adjusted under 35 U.S.C. 154(b) by 51 days.

(21) Appl. No.: 14/426,823

(22) PCT Filed: Sep. 20, 2013

(86) PCT No.: PCT/EP2013/069565
§ 371 (c)(1),
(2) Date: Mar. 9, 2015

(87) PCT Pub. No.: WO2014/053337
PCT Pub. Date: Apr. 10, 2014

(65) Prior Publication Data
US 2015/0241848 A1    Aug. 27, 2015

(30) Foreign Application Priority Data

Oct. 4, 2012 (EP) .................................... 12187215

(51) Int. Cl.
| | |
|---|---|
| *G04B 19/32* | (2006.01) |
| *F21V 14/08* | (2006.01) |
| *F21V 8/00* | (2006.01) |
| *G04B 19/30* | (2006.01) |

(52) U.S. Cl.
CPC ............... *G04B 19/32* (2013.01); *F21V 14/08* (2013.01); *G02B 6/0001* (2013.01); *G04B 19/30* (2013.01)

(58) Field of Classification Search
CPC .... G04B 19/32; G04B 19/30; G04B 19/305; G04B 19/22; G04B 19/20; G04B 25/00; F21V 14/08; F21V 9/00; F21V 9/16; F21V 33/00; F21V 33/0004; G02B 6/0001; G04C 19/02; G04C 17/02; C09K 11/00; F21K 2/00
See application file for complete search history.

(56) References Cited

U.S. PATENT DOCUMENTS 3,156,990 A * 11/1964 Dock ..................... G04B 47/00
368/223
3,270,201 A * 8/1966 Hardesty ................ B60K 37/02
116/329

(Continued)

FOREIGN PATENT DOCUMENTS

| FR | 1 114 341 | 4/1956 |
| FR | 2 011 614 | 3/1970 |
| WO | 2005 045533 | 5/2005 |

OTHER PUBLICATIONS

International Search Report Issued Nov. 7, 2013 in PCT/EP2013/069565 Filed Sep. 20, 2013.

*Primary Examiner* — Bao Q Truong
(74) *Attorney, Agent, or Firm* — Oblon, McClelland, Maier & Neustadt, L.L.P.

(57) ABSTRACT

A device for illuminating at least one display indicator incorporated in a case underneath an aperture of a horological or scientific apparatus, the device including a phosphorescent light source inside the case, a mechanism collecting external light energy from an ambient medium from the case towards the phosphorescent light source, and at least one light component formed, either by the source, or by a light relay connected to the source by a transmission mechanism, and the light component is configured, to illuminate the indicator, either on the opposite side to the aperture relative to the indicator, or at a periphery of the aperture, and a controller is configured to move a cover insertable between the light component and the indicator.

17 Claims, 3 Drawing Sheets

(56) References Cited

U.S. PATENT DOCUMENTS

| | | |
|---|---|---|
| 3,566,602 A | 3/1971 | Bergey et al. |
| 3,851,460 A | 12/1974 | Piquerez |
| 7,366,059 B2 * | 4/2008 | Seyr .................. G04B 19/32 368/226 |
| 2005/0018545 A1 | 1/2005 | Seyr |
| 2011/0164475 A1 | 7/2011 | Wenzel |

* cited by examiner

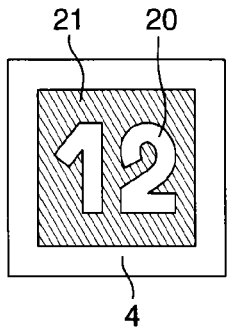
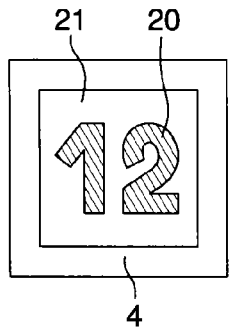
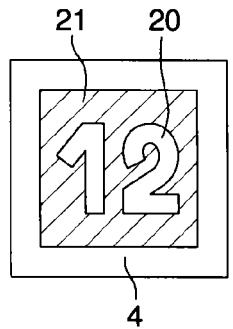
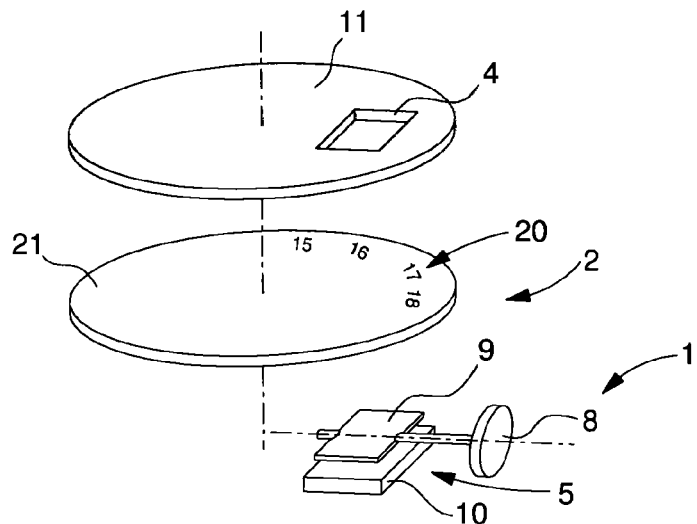
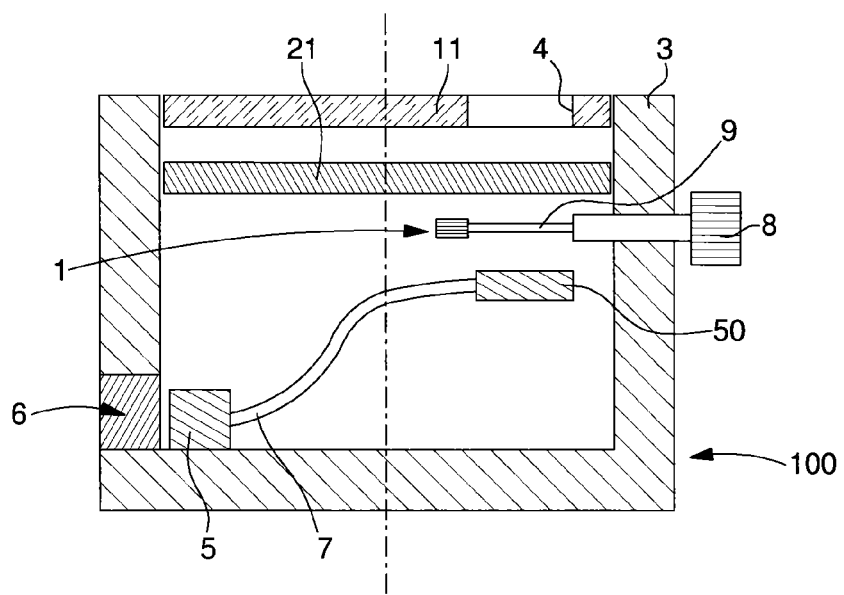

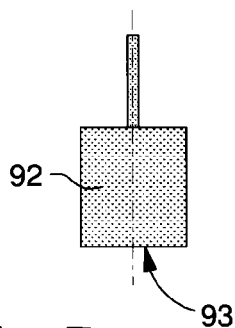
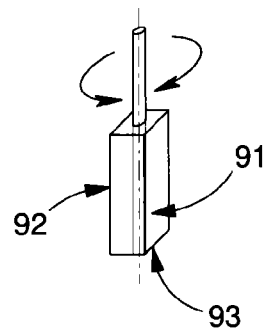
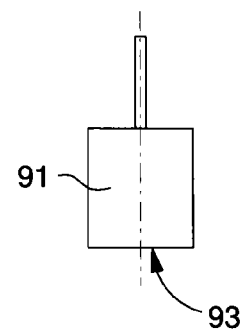
Fig. 6A  Fig. 6B  Fig. 6C
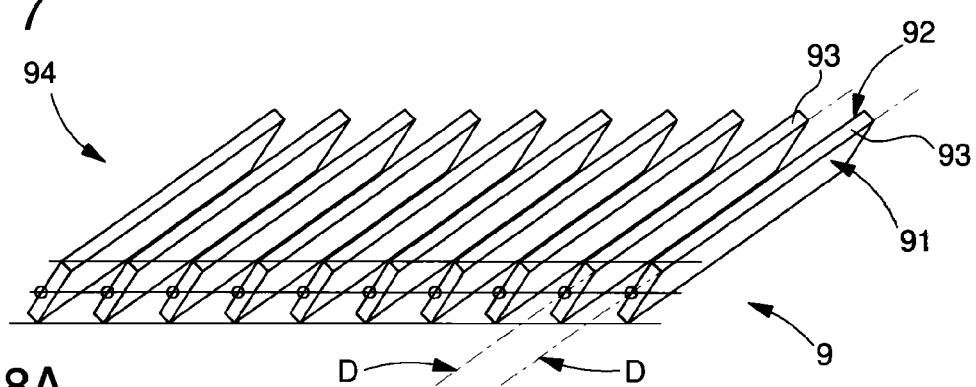
Fig. 7
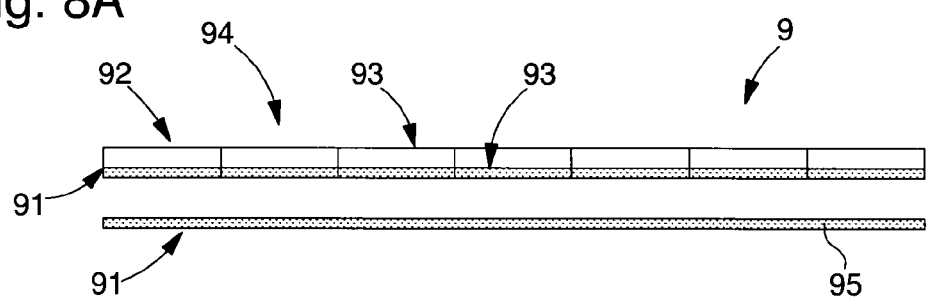
Fig. 8A
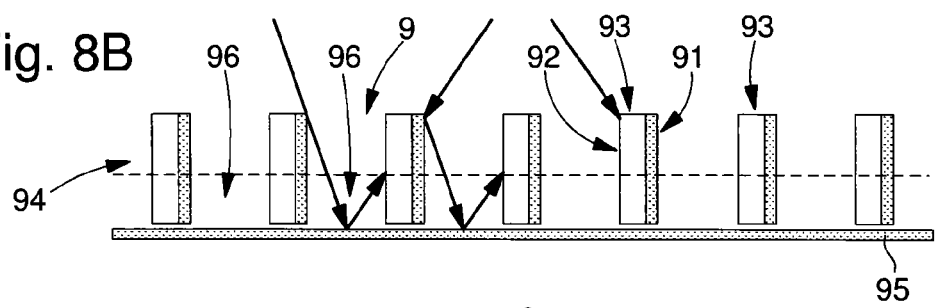
Fig. 8B
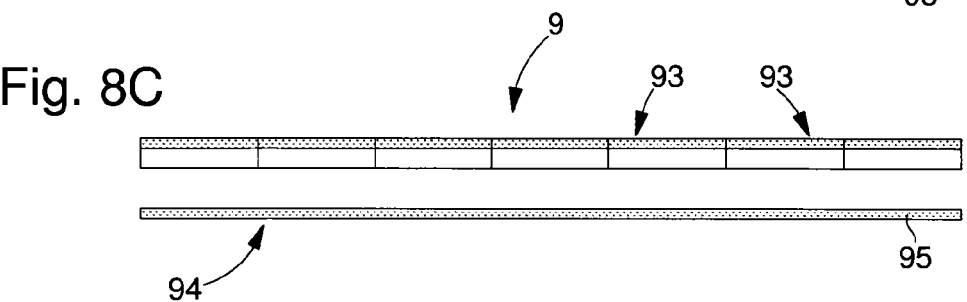
Fig. 8C

ILLUMINATION OF A DATE MECHANISM

CROSS-REFERENCE TO RELATED APPLICATIONS

This is a National phase application in the United States of International Patent Application PCT/EP2013/069565 filed Sep. 20, 2013 which claims priority on European patent application No. 12187215.4 filed Oct. 4, 2012. The entire disclosure of the above patent applications are hereby incorporated by reference.

FIELD OF THE INVENTION

The invention concerns a device for illuminating at least one display indicator of a horological or scientific apparatus, said indicator being incorporated in a case underneath an aperture, said device including at least one phosphorescent light source inside said case, means of collecting external light energy from the ambient medium of said case towards said phosphorescent light source, and in said device is arranged at least one light component formed, either by said phosphorescent light source, or by a light relay connected to said phosphorescent light source by means of transmitting the light energy retransmitted by said phosphorescent light source, to illuminate said indicator, either on the opposite side to said aperture relative to said indicator, or at the periphery of said aperture.

The invention further concerns a horological or scientific apparatus, comprising such a device for illuminating at least one display indicator comprised in said apparatus inside a case underneath an aperture.

The invention concerns the field of horological or scientific apparatuses, and more specifically the field of horology and watches.

BACKGROUND OF THE INVENTION

The utilisation of horological or scientific apparatuses, at night or in poor visibility, has always been inconvenient. In horology, the need to tell the time in the dark has, in the past, given rise to tact watches, and also to watches that strike on demand, whose cost prevented widespread use. The use of radioactive paints, particularly radium-based paints, has made night reading easier, but at the cost of the user's health, and with a conspicuous appearance, day and night, which is often not appreciated by the user. The miniaturisation of electrical energy sources then made it possible to incorporate electrical lighting devices, but with the constraint that the cells or batteries frequently require changing. There are capacitor or battery charger mechanisms using the motions of certain watch components, such as the oscillating weight, but they are expensive and occupy internal space.

US Patent Application No 2005/018545A1, in the name of SEYR ERNEST (ETERNA), discloses a watch display device with a luminescent surface for backlighting a display element (alphanumerical symbols). These symbols may be mounted in an aperture in an opaque dial, the luminescent surface covers at least a partial section of a support surface arranged behind the aperture, the alphanumerical symbols of the display element include an opaque material, and the alphanumerical symbols of the display element are arranged between the dial and the luminescent surface.

U.S. Pat. No. 3,851,460A in the name of PIQUEREZ discloses a watch with a glass comprising a metallized groove filled with a luminescent material which reflects the light from the luminescent material towards the watch dial.

US Patent Application No 2011/164475 A1 in the name of JAN WENZEL (LANGE UHREN) discloses a watch with a pot-shaped case, comprising an opening oriented towards a user, with a movement and components comprising upper light-receiving surfaces arranged in the case and revealed by an open part allowing light to pass through from the user's side, the light from the exterior reaching said light-receiving surfaces through said open part, the open part is transparent to ultra violet rays, and is opaque at least to the visible light spectrum.

WO Patent Application No 2005/045533A1 in the name of LANGE UHREN discloses a watch display. A luminescent material is applied to the display discs, on which display symbols are printed, or which surrounds pre-printed symbols, so as to form a luminescent surface which makes the symbols visible in the dark or in low lighting.

FR Patent Application No 2011614A1 in the name of HAMILTON MATCH CY discloses a watch with luminous information means, visible through an aperture, and comprising an optical fibre beam. The watch case may carry a lighting source, which may be a radioactive source.

SUMMARY OF THE INVENTION

The invention proposes to overcome the problems of the prior art, and to provide a solution to the problem of illuminating a display in night mode, whether it is a display of horological magnitudes, physical magnitudes measured by a sensor or similar, or data entered into an apparatus.

To this end, the invention concerns a device for illuminating at least one display indicator of a horological or scientific apparatus, said indicator being incorporated in a case underneath an aperture, said device including at least one phosphorescent light source inside said case, means of collecting external light energy from the ambient medium of said case towards said phosphorescent light source, and in said device is arranged at least one light component formed, either by said phosphorescent light source, or by a light relay connected to said phosphorescent light source by means of transmitting the light energy retransmitted by said phosphorescent light source, to illuminate said indicator, either on the opposite side to said aperture relative to said indicator, or at the periphery of said aperture, characterized in that said device includes a control means arranged to move a cover that is insertable between said light component and said indicator between an obscuring position where said cover obstructs the passage of light between said light component and said indicator, and a lighting position where said cover does not impede the passage of light.

The invention further concerns a horological or scientific apparatus, comprising such a device for illuminating at least one display indicator comprised in said apparatus inside a case underneath an aperture.

BRIEF DESCRIPTION OF THE DRAWINGS

Other features and advantages of the invention will appear upon reading the following detailed description, with reference to the annexed drawings, in which:

FIG. 3 shows a schematic front view of three alternatives for displaying a date through the aperture in the dial: in FIG. 3A an opaque date disc with display elements formed by numerals transparent to light, through which is visible the light retransmitted by the phosphorescent light source; in FIG. 3B a transparent date disc, through which is visible the light retransmitted by the phosphorescent light source which is stopped by display elements formed by numerals opaque to light; in FIG. 3C a date disc forming a light guide, comprising display elements formed by phosphorescent numerals which retransmit light after it is captured and diffused by the light guide, with a higher luminous intensity than that visible through the disc.

FIG. 4 shows, in a similar manner to FIG. 1, the apparatus provided with a cover for obscuring the light retransmitted by the phosphorescent light source, to ensure lighting on demand.

FIG. 5 shows a schematic cross-section of a timepiece according to FIG. 1, comprising a light relay connected to a phosphorescent light source by means of transmitting the light energy retransmitted by the phosphorescent light source, this light relay being located underneath the cover of FIG. 4.

FIGS. 6A, 6B, 6C show schematic side views of a cover according to a variant of the invention, in 6A with a first phosphorescent or luminescent surface, in 6C with a second opaque surface, in 6B with said cover pivoting between these two positions where it is respectively transmissive or opaque.

FIG. 7 shows a schematic perspective view of another variant of the invention wherein the cover comprises a mechanism with adjustable blind-type slats, each of the type illustrated in FIGS. 6A to 6C. This mechanism is shown in three positions:

in FIG. 8A a closed position at 0° where the first transmissive surfaces of the slats are turned towards a display indicator, in FIG. 8B an open position at 90°, where the mechanism is open, with the slats rotated through 90° and where the first transmissive surfaces of the slats are recharged by means of multiple reflections of light in wells, in FIG. 8C a closed position at 180°, where the second opaque surfaces of the slats are turned towards the display indicator.

DETAILED DESCRIPTION OF PREFERRED EMBODIMENTS

Figure 1:
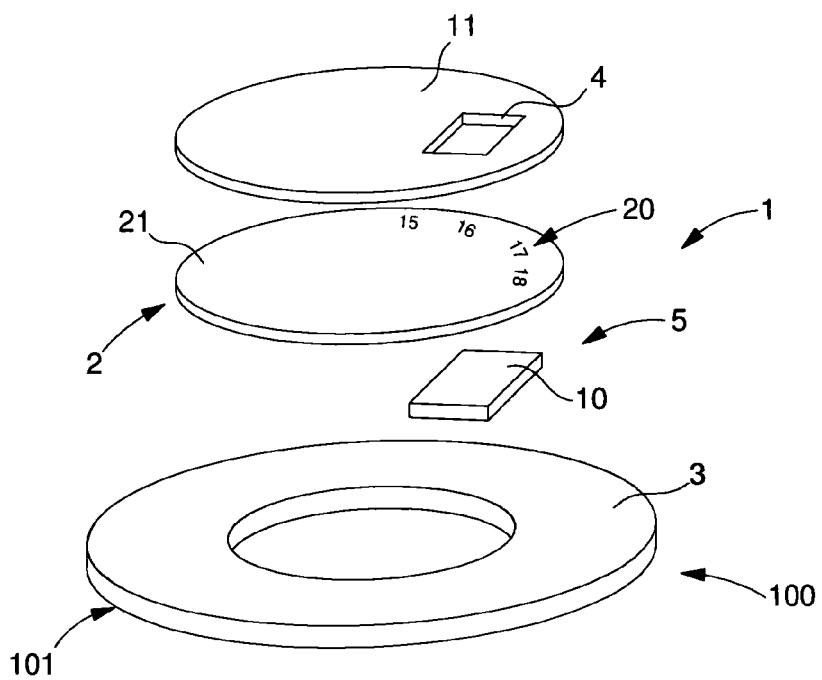
FIG. 1 shows a schematic, partial, exploded view of a horological apparatus, in this case a watch with a date disc disposed underneath a dial traversed by an aperture, and a phosphorescent light source according to the invention disposed underneath the date disc and facing the aperture, on the opposite side thereto relative to the disc.
Figure 2:
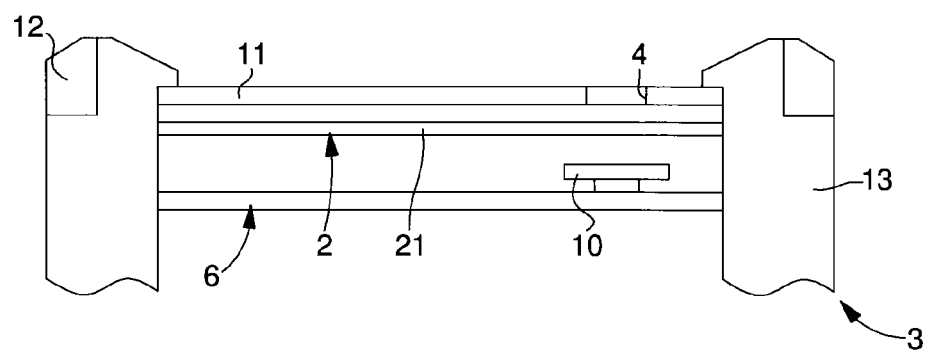
FIG. 2 shows a schematic, partial, cross-sectional view of the apparatus of FIG. 1 with light collection means at the periphery of a case with a bezel which houses the dial, disc and light source.

According to the invention, at least one light source is housed inside the internal volume of a watch case, the light produced by the light source can escape towards the exterior of the watch case through at least one external element of the watch, which is at least partially transparent or at the very least translucent. There is thus created a timepiece permitting viewing of certain displays in the dark or darkness.

The light produced by this source passes through the transparent or translucent portion of the external part concerned.

The light source must be recharged with energy. The usual powering configurations using a cell or battery, charged by means of a moving member, such as the oscillating weight or suchlike, or by piezoelectric effect, are not described here. The present description concerns the specific case of a phosphorescent and/or fluorescent light source, preferably phosphorescent because of the longer afterglow duration, which may be up to several hours, and is compatible with the possibility of illuminating a display at any time throughout the duration of one night.

The light source will be termed "phosphorescent" in the description below for the sake of simplicity. Such a phosphorescent source advantageously comprises rare earth aluminates, well known to physicists, for example strontium aluminate $SrAl_2O_4$ doped with europium, one variety of which is known as "Super-LumiNova", or rare earth silicates, or a mixture of rare earth aluminates and silicates. Other commercial materials such as "Lumibrite" are also suitable. Materials like tritium (3H), promethium-147, or radium-226 have excellent phosphorescent properties, but their high beta and/or gamma radioactivity greatly limits their use, and they can only be used in trace amounts, preferably in combination with rare earth aluminates, for some very specific military or astronautic applications, use at great depths, or similar, and with protection which considerably increases the volume of the timepiece; the terms "radioluminescence" or "autoluminescence" are employed where these materials are used. There are also known borosilicate capsules containing gases, known as "GTLS" produced by MB Microtech, containing tritium (3H), and which, like radium, do not require any external excitation to emit light, such capsules are used in particular for illuminating mainly military watch hands or appliques.

The excitation light originates from the user's environment, solar light, ambient light, and it is an object of the invention to ensure sufficient transmission of this available ambient light towards the light source.

The light source is housed inside the inner volume of the case of the timepiece or of the watch. The ambient energy can be collected in a partially or totally transparent, or translucent case middle and/or in a partially or totally transparent or translucent dial and/or in a display aperture, particularly for a date or suchlike. Ambient energy may also be collected by an accessory adjoining the timepiece, such as a watch bracelet or strap, and be transmitted by a wave guide or fibre optic or suchlike. Similarly, ambient energy may be captured in other external parts such as the back cover, bezel, flange or other parts.

As regards the transmission of light by the phosphorescent light source to the user, various paths may be envisaged:

the light produced by the phosphorescent light source directly lights the transparent or translucent areas of at least one component through which light is required to exit. This embodiment is applicable when there is no obstacle inserted between the phosphorescent light source and the component to be illuminated;

the component to be illuminated is made of a material, particularly a plastic material, charged with fluorescent and/or phosphorescent particles, capable of absorbing the transmitted radiation and of retransmitting a homogeneous visible light. According to the type of particles selected, whether they are fluorescent and/or phosphorescent, the luminous effect ceases as soon as the light source is turned off or conversely continues by the effect of afterglow;

the light produced by the phosphorescent light source is injected into a light guide which then leads the light to the component to be illuminated. According to a variant, the light guide is an optical fibre which can bypass any obstacles that may stand between the phosphorescent light source and the component. The optical fibre may be an optical fibre that diffuses injected light throughout its length.

For a preferred application to a watch, the invention prefers the following light paths:
- through a transparent, or translucent or semi-transparent dial;
- through apertures in a dial, particularly disguised in a decorative surrounding;
- through an aperture for display of a magnitude, particularly, in a specific case, a date aperture;
- through a bezel or case that is transparent, or translucent, or semi-transparent, designed to collect energy from ambient light, concentrate and then send it across the phosphorescent light source, directly or indirectly through a light guide or an optical fibre or similar;
- through a light guide, or an optical fibre or similar, which collects and concentrates light in a particular area of the timepiece, then conveys it to illuminate and charge the phosphorescent light source.

The component to be illuminated may adopt several configurations:
- an opaque component with display elements, such as numerals or characters or symbols that are transparent or translucent, or etched or pierced or similar, to allow light to pass through the component;
- a transparent or translucent component, with display elements, such as numerals or characters or symbols that are opaque, and obstruct the passage of light;
- a transparent or translucent component, with display elements such as phosphorescent numerals or characters or symbols forming light guides, which themselves emit light towards the user;
- an opaque component, with display elements such as phosphorescent numerals or characters or symbols, and forming light guides in the thickness of the component between the lower surface and upper surface thereof, thus themselves emitting light towards the user;
- a component forming a light guide to which phosphorescent display elements, such as numerals or characters or symbols, are affixed. Structuring the surface of the light guide makes it possible to couple the ambient light inside the light guide, so that the light is conveyed by the display elements which ultimately absorb and retransmit the light by phosphorescence;
- an opaque component illuminated by the periphery of an aperture, which transmits the light emitted by the phosphorescent light source.

At the places where the light must not pass, the component concerned may be opaque throughout or coated with an opaque surface treatment such as a paint or similar.

The phosphorescent light source advantageously includes at least one disc of suitable material, particularly strontium aluminate $SrAl_2O_4$ doped with europium. This at least one disc may take different shapes and positions:
- a solid disc, such as a washer or prism, disposed underneath a display indicator, namely on the opposite side to the timepiece glass, relative to the indicator;
- an annular or hollowed disc, disposed around a display indicator, particularly around a dial or around an aperture;
- a solid disc, such as a washer or prism, disposed in any area of the timepiece, and connected by a first light guide or an optical fibre or similar to ambient energy collection means, and by a second light guide, which may be merged with the first light guide, said second light guide being connected to a shaped or solid, or annular or hollowed light relay, said light relay being disposed underneath the display indicator to be illuminated or around said indicator.

The invention is applicable to all the usual display members of a timepiece or watch. So as not to hinder the user, it is, however restricted to the illumination of a restricted number of display members. In a specific variant, a cover, a blind or screen may be inserted on the path of light emitted by a phosphorescent light source, for example between the source and the light indicator to be illuminated, this cover being made to disappear, or set in place, by a mechanical action of the user, on a control means such as a push button, a crown, a rotating bezel or suchlike. This cover may be made:
- of opaque material having an aesthetic function in day mode, and enhancing the contrast for reading numerals;
- of reflective material permitting part of the ambient light to pass through for energy charging during the day, but rendering the phosphorescent light source or its relay invisible at night without any action by the user.

An example embodiment concerns the application of the invention to the illumination of a date mechanism, the watchmaker will know how to extrapolate to other common watch displays, particularly to displays using discs. A date display mechanism generally comprises a disc whose periphery includes numerals corresponding to the successive dates in a month. This disc is disposed underneath the dial, which is in turn disposed under a glass which delimits the watch on the user's side. The dial comprises an aperture, through which part of the disc is visible. During the movement of the disc, the numbers pass underneath the aperture, the watch movement, or its mechanism if it is a mechanical watch, is synchronised so that the number appearing underneath the aperture corresponds to the date. A phosphorescent light source, or a light relay of the source, is positioned, either under the date disc, coinciding with the aperture, or at the edge of the aperture. In day mode, the phosphorescent light source is charged with luminous energy by absorbing part of the spectrum of natural or artificial ambient light. The phosphorescent light source then gradually retransmits this energy in the form of visible light. In night mode, in darkness, the light transmission from the phosphorescent light source remains visible for several hours and can thus be used to illuminate the date. The use of a cover as described above allows the date to be illuminated on demand. Indeed, the phosphorescent light source illuminates permanently and cannot be disconnected, but only obscured. The advantage of lighting the area located underneath the aperture, or the periphery of the aperture, is that the new date appearing at midnight is as well illuminated as the previous day's date, which would not be the case, for example, where a date disc with phosphorescent numerals were merely used, since in that case, only the date of the previous day would receive charging energy, and not that of the following day As seen in the Figures, the invention therefore concerns a device 1 for illuminating at least one display indicator 2 of a horological or scientific apparatus 100. The Figures illustrate the invention, in a non-limiting manner, with an indicator 2 which is a date disc or ring, which is therefore the component to be illuminated. This indicator 2 is incorporated in a case 3 underneath an aperture 4. According to the invention, device 1 comprises at least one phosphorescent light source 5 inside case 3, means of collecting external light energy from the ambient medium of case 3 in the direction of phosphorescent light source 5.

A light component 10 is formed, either by phosphorescent light source 5 or by a light relay 50 connected to phosphorescent light source 5 by means 7 of transmitting light energy retransmitted by phosphorescent light source 5. This light component 10 is arranged, to illuminate indicator 2, either on the opposite side to aperture 4 relative to indicator 2, or at the periphery of aperture 4, particularly by diffusion throughout the thickness of the aperture.

In the variant illustrated by the Figures, light component 10 is arranged, to illuminate indicator 2, on the opposite side to aperture 4 relative to indicator 2.

In FIG. 3A, indicator 2 is an opaque component with transparent or translucent display elements 20 allowing light to pass through indicator 2.

In FIG. 3B, indicator 2 is a transparent or translucent component, with opaque display elements 20 obstructing the passage of light.

In FIG. 3C, indicator 2 is a component forming a light guide-collector, comprising display elements 20 formed by phosphorescent numerals, for example printed in phosphorescent material. These display elements 20 absorb the light collected by light guide-indicator 2, and retransmit the light through phosphorescence, with a higher luminous intensity than that visible through disc 2. Only the display element 20 which passes underneath aperture 4 is visible.

In a variant that is not illustrated in the Figures, light component 10 is arranged at the periphery of aperture 4 and indicator 2 is an opaque component illuminated by the periphery of aperture 4, which forms a light relay 50 that transmits light emitted by phosphorescent light source 5. In an advantageous alternative, the light source is thus located, not underneath the disc, but at the periphery of aperture 4. This aperture 4 emits throughout its thickness, over the entire periphery of its cut edge, except on the upper surface of the dial, which is protected by an opaque coating obstructing the passage of light.

According to the invention, advantageously, for lighting on demand, device 1 comprises obscuring means; to this end, as seen in FIG. 4, it comprises a control means 8, for example a pusher, arranged to move a cover 9 insertable between light component 10 and indicator 2 between an obscuring position where cover 9 obstructs the passage of light between light component 10 and indicator 2, and a lighting position where cover 9 does not impede the passage of light.

In a first variant, this cover 9 is made of opaque material with an aesthetic function in day mode, and enhancing contrast in the reading of indicator 2.

In another variant, cover 9 is made of transflective material allowing part of the ambient light external to case 3 to pass for energy recharging in the day, but which renders light component 10 invisible at night.

As regards means 6 of collecting external light energy from the ambient medium of case 3 towards said phosphorescent light source 5, said means advantageously collect light through a transparent or translucent or semi-transparent dial 11 comprised in case 3, and aperture 4 is arranged inside dial 11 or around said dial 11.

Collection means 6 may also collect light through apertures in such a transparent, or translucent or semi-transparent dial 11 comprised in case 3 and aperture 4 is arranged in dial 11 or around said dial 11.

Collection means may also collect light through such an aperture 4.

In another variant, collection means 6 collect light through a transparent, or translucent, or semi-transparent bezel 12 or case 13, comprised in case 3, designed to collect energy from ambient light, concentrate and then send it across the phosphorescent light source 5, directly or indirectly through a light guide or an optical fibre.

In yet another variant, collection means 6 collect light through a light guide or an optical fibre, which collects and concentrates the light in a specific area of case 3, then conveys it to illuminate and charge phosphorescent light source 5.

In this specific application illustrated by the Figures, indicator 2 is a timepiece date disc.

The invention further concerns a horological or scientific apparatus 100, comprising such a device 1 for illuminating at least one display indicator 2 comprised in said apparatus 100 inside a case 3 underneath an aperture 4.

In the illustrated application, apparatus 100 is formed by a watch 101 whose display indicator 2 is a date disc 21.

The advantage of the invention is that it does not require any electrical power. The invention may be integrated both in a mechanical watch and an electronic watch, and even in a scientific apparatus, such as a compass, or a counter, or in military equipment, such as an artillery aiming apparatus or similar, or in aviation equipment, for example for the display of a reference pressure, a course or a frequency.

The invention is also applicable to the backlighting of telephone screens or electronic displays or similar.

In a specific embodiment, the cover/blind 9 has a "mirrored" surface which, when in the closed position (date invisible at night), allows the light emitted by the phosphorescent source to be reflected back onto the source, and thereby limit the decrease of light.

The light collection means are advantageously light traps which confine the light until it is removed to illuminate/excite the phosphorescent element; thus preventing undesirable leaks that are potentially visible at night.

In yet another variant, instead of having a cover 9 separate from the phosphorescent disc, cover 9 comprises at least one slat 93 which in turn comprises a first surface 92 with a phosphorescent or luminescent disc or coating, and a second opaque, metallized or painted surface 91, said cover 9 being pivotally mounted so that, in a rotation on its axis of 180°, cover 9 is transmissive or opaque, according to the surface turned towards display indicator 2, particularly a date disc, as seen in FIGS. 6A, 6B and 6C. The mechanisms for recharging phosphorescent disc 92 are those described above. This option requires sufficient volume to rotate a disc of several $mm^2$ on itself, which is naturally easier in a pendulum or a scientific apparatus than in a watch. A cover with lateral opening by translation, to reveal the phosphorescent light source 5 or light component 10, is another solution that can be used, which also requires a certain operating volume.

To reduce as far as possible the requirement for space, another variant is illustrated in FIGS. 7, 8A, 8B, 8C, and cover 9 comprises at least one mechanism 94 with orientable slats 93 whose axes D are parallel to each other, of the blind type, each slat 93 comprising a first surface 92 comprising a luminescent or phosphorescent disc or coating, and a second opaque metallized or similar surface 91. This mechanism 94 can occupy at least three possible positions: a closed position at 0° in FIG. 8A where the first surfaces 92 of slats 93 are turned towards display indicator 2, an open position at approximately 90° in FIG. 8B where the first surfaces 92 of slats 93 are recharged by means of multiple reflections in wells 96 and where indicator 2, particularly a date, can be read against the background 95 which appears through slats 93, and a closed position at 180° in FIG. 8C where the second surfaces 91 of slats 93 are turned towards display indicator 2. The rotation of slats 93 can be controlled with a rotating motion of the crown type, or by a pusher type action or similar.

The invention claimed is:

1. A device for illuminating at least one display indicator of a horological or scientific apparatus, the indicator being incorporated in a case in the device underneath an aperture also in the device, the device comprising:
   at least one phosphorescent light source inside the case;
   means of collecting external light energy from an ambient medium of the case towards the phosphorescent light source;
   at least one light component formed either by the phosphorescent light source or by a light relay connected to the phosphorescent light source by a means of transmitting light energy retransmitted by the phosphorescent light source, to illuminate the indicator, either on the opposite side to the aperture relative to the indicator, or at a periphery of the aperture;
   a cover insertable between the light component and the indicator between an obscuring position, where the cover obstructs passage of light between the light component and the indicator, and a lighting position, where the cover does not obstruct the passage of light; and
   a control means configured to move the cover; and
wherein the cover is made of opaque material with an aesthetic function in a day mode, and enhancing contrast in reading of the indicator.

2. The device according to claim 1, wherein the cover comprises at least one slat which in turn comprises a first phosphorescent or luminescent surface, and a second opaque surface, the cover being pivotally mounted to be transmissive or opaque, according to the surface turned towards the display indicator.

3. The device according to claim 1, wherein the cover comprises at least one mechanism with orientable slats, of blind type, each slat comprising a first luminescent or phosphorescent surface, and a second opaque surface, the mechanism being configured to occupy at least three positions: a closed position where the surfaces of the slats are turned towards the display indicator, an open position where the mechanism is open, with the slats rotated at 90° and where the first luminescent or phosphorescent surfaces are recharged by multiple reflections in wells, and another closed position where the second surfaces of the slats are turned towards the display indicator.

4. The device according to claim 1, wherein the light component is configured to illuminate the indicator on an opposite side to the aperture relative to the indicator.

5. The device according to claim 1, wherein the indicator is an opaque component with transparent or translucent display elements allowing light to pass through the indicator.

6. The device according to claim 1, wherein the indicator is a transparent or translucent component with opaque display elements obstructing the passage of light.

7. The device according to claim 1, wherein the indicator is a light guide-collector, with phosphorescent display elements which absorb the light collected by the indicator and retransmit light by phosphorescence towards a user through the aperture.

8. The device according to claim 1, wherein the light component is arranged at the periphery of the aperture and wherein the indicator is an opaque component illuminated by the periphery of the aperture, which forms a light relay that transmits light emitted by the phosphorescent light source.

9. The device according to claim 1, wherein the means of collecting external light energy from the ambient medium of the case towards the phosphorescent light source collects light through a transparent or translucent or semi-transparent dial in the case, and wherein the aperture is arranged inside the dial or around the dial.

10. The device according to claim 1, wherein the collection means collects light through openings in a transparent or translucent or semi-transparent dial in the case, and wherein the aperture is arranged inside the dial or around the dial.

11. The device according to claim 1, wherein the collection means collects light through the aperture.

12. The device according to claim 1, wherein the collection means collects light through a transparent, or translucent, or semi-transparent bezel or case, in the case, configured to collect energy from ambient light, concentrate and then send the light across the phosphorescent light source, directly or indirectly through a light guide or an optical fiber.

13. The device according to claim 1, wherein the collection means collects light through a light guide or an optical fiber, which collects and concentrates the light in a specific area of the case, then conveys the light to illuminate and charge the phosphorescent light source.

14. The device according to claim 1, wherein the indicator is a timepiece date disc.

15. An horological or scientific apparatus comprising a device according to claim 1 for illuminating at least one display indicator in the apparatus inside a case underneath a dial.

16. An apparatus according to claim 15, wherein the apparatus is formed by a watch, and wherein the display indicator is a date disc.

17. A device for illuminating at least one display indicator of a horological or scientific apparatus, the indicator being incorporated in a case in the device underneath an aperture also in the device, the device comprising:
   at least one phosphorescent light source inside the case;
   means of collecting external light energy from an ambient medium of the case towards the phosphorescent light source;
   at least one light component formed either by the phosphorescent light source or by a light relay connected to the phosphorescent light source by means of transmitting the light energy retransmitted by the phosphorescent light source, to illuminate the indicator, either on the opposite side to the aperture relative to the indicator, or at a periphery of the aperture;
   a cover insertable between the light component and the indicator between an obscuring position, where the cover obstructs passage of light between the light component and the indicator, and a lighting position, where the cover does not obstruct the passage of light,
   wherein the cover is made of transflective material allowing part of ambient light external to the case to pass for energy recharging in the day, but which renders the light component invisible at night.

* * * * *